US008251607B2

(12) United States Patent
Buch

(10) Patent No.: US 8,251,607 B2
(45) Date of Patent: Aug. 28, 2012

(54) SYSTEM AND APPARATUS OF FLUID STORAGE USING PAVER BLOCKS

(75) Inventor: Douglas J. Buch, Greenfield, WI (US)

(73) Assignee: ECS Solutions, LLC, Greenfield, WI (US)

( * ) Notice: Subject to any disclaimer, the term of this patent is extended or adjusted under 35 U.S.C. 154(b) by 933 days.

(21) Appl. No.: 12/014,325

(22) Filed: Jan. 15, 2008

(65) Prior Publication Data

US 2009/0180833 A1 Jul. 16, 2009

(51) Int. Cl.
*E01C 5/00* (2006.01)
(52) U.S. Cl. .............. 404/41; 404/34; 52/606; 52/607
(58) Field of Classification Search .............. 52/596, 52/607, 606; 404/34, 39, 41; 405/16, 20; D25/113, 114
See application file for complete search history.

(56) References Cited

U.S. PATENT DOCUMENTS

| | | | | |
|---|---|---|---|---|
| 19,592 | A * | 3/1858 | Tewkesbury | 404/34 |
| 61,580 | A * | 1/1867 | Tarr | 404/41 |
| 378,825 | A * | 2/1888 | Brannigan | 404/34 |
| 379,926 | A * | 3/1888 | Anderson | 404/19 |
| 572,762 | A | 12/1896 | Landers | |
| 815,641 | A * | 3/1906 | Schoeneman | 52/607 |
| 836,017 | A * | 11/1906 | Douglass | 52/607 |
| 1,277,829 | A * | 9/1918 | Baum | 52/607 |
| 1,305,294 | A * | 6/1919 | McIntyre | 52/607 |
| 4,227,829 | A * | 10/1980 | Landry, Jr. | 405/20 |
| 4,246,305 | A * | 1/1981 | Delattre | 428/36.9 |
| 4,370,075 | A * | 1/1983 | Scales | 405/20 |
| 4,571,353 | A * | 2/1986 | Gable, Jr. | 428/33 |
| 4,572,699 | A * | 2/1986 | Rinninger | 404/42 |
| 4,719,738 | A * | 1/1988 | Lee | 52/607 |
| 4,792,257 | A * | 12/1988 | Rinninger | 404/41 |
| 5,159,801 | A * | 11/1992 | Schmidt | 52/575 |
| 5,281,048 | A * | 1/1994 | Hagenah | 404/44 |
| 5,484,230 | A * | 1/1996 | Rudloff | 405/20 |
| 5,499,888 | A | 3/1996 | Hawkes | |
| 5,533,827 | A * | 7/1996 | Scheiwiller | 404/38 |
| 5,797,698 | A | 8/1998 | Barth et al. | |
| D399,577 | S | 10/1998 | Scales | |
| 5,921,710 | A | 7/1999 | Scales | |
| 6,164,026 | A * | 12/2000 | Ehrenkrantz | 52/220.2 |

(Continued)

FOREIGN PATENT DOCUMENTS

DE 10244929 A1 4/2003

(Continued)

OTHER PUBLICATIONS

International Search Report for International application No. PCT/US2009/031079, International filing date is Jan. 15, 2009.

(Continued)

*Primary Examiner* — Gary S Hartmann
(74) *Attorney, Agent, or Firm* — Boyle Fredrickson, S.C.

(57) ABSTRACT

Systems and methods for a porous pavement system are described. The porous pavement system includes paver blocks designed to facilitate water seepage between the paver blocks and to permit water storage within the blocks. The paver blocks may be cabled together to create paving units that facilitate installation and maintenance of the pavement system. The porous pavement system provides improved management of stormwater, reducing runoff and facilitating infiltration of stormwater into the subgrade below the paving system.

13 Claims, 6 Drawing Sheets

U.S. PATENT DOCUMENTS

| | | | |
|---|---|---|---|
| 6,416,253 B1* | 7/2002 | Wimp et al. | 405/172 |
| 6,508,607 B1 | 1/2003 | Smith et al. | |
| 6,536,988 B2* | 3/2003 | Geiger | 404/39 |
| 6,579,038 B1* | 6/2003 | McAllister et al. | 405/16 |
| 6,682,269 B2* | 1/2004 | Price et al. | 405/284 |
| 6,939,077 B1* | 9/2005 | Hart | 404/39 |
| D516,735 S | 3/2006 | Kees et al. | |
| D575,414 S | 8/2008 | Salerno | |
| 7,594,365 B2* | 9/2009 | Kang et al. | 52/220.2 |
| D609,369 S* | 2/2010 | Buch | D25/113 |
| 7,717,644 B2* | 5/2010 | Han | 405/33 |
| 2002/0124509 A1* | 9/2002 | Smyer, III | 52/439 |
| 2005/0055983 A1 | 3/2005 | Tomes | |
| 2005/0252145 A1* | 11/2005 | MacDonald et al. | 52/606 |
| 2007/0269265 A1* | 11/2007 | Thorkelson | 404/34 |
| 2011/0250013 A1* | 10/2011 | Buch | 404/34 |

FOREIGN PATENT DOCUMENTS

| | | |
|---|---|---|
| GB | 2134561 A | 8/1984 |
| JP | 7197429 A | 8/1995 |

OTHER PUBLICATIONS

U.S. Appl. No. 29/338,089, filed Jun. 4, 2009, Douglas J. Buch.
Eco Creto Frequently Asked Questions, http://www.ecocreto.com/fag.html, Jul. 10, 2007.
Photographs from Eco Creto Office and parking lot, Jul. 2, 2007.
Advanced Pavement Technology, Eco-Brick and Aqua-Loc Brochure.
SF-RIMA Permeable Concrete Paving Stone System Brochure.
Uni-Group U.S.A., Uni Eco-Stone website http://www.uni-groupusa.org/uni-eco-.htm, Sep. 12, 2006.
PaveDrain, LLC, Competitive Analysis document, Jul. 2007, pp. 13-14 Discusses Egra Stone by Paveloc Industries.
Armortec, Armorflex Standard Detail (Class 70 Dimensions), CAD drawing available online: http://www.contech-cpi.com/media/assets/asset/file_name/5408/Class_70_Dimensions.pdf.
PCT/US2009/031079; International Filing Date Jan. 15, 2009, Notification Concerning Transmittal of International Preliminary Report on Patentability; International Preliminary Report on Patentability; Written Opinion of the International Searching Authority.

* cited by examiner

SYSTEM AND APPARATUS OF FLUID STORAGE USING PAVER BLOCKS

BACKGROUND OF THE INVENTION

1. Field of the Invention

The present invention relates in general to the field of paving systems. More particularly, the present invention relates to paver blocks. Specifically, a preferred embodiment of the present invention relates to paver blocks which may be installed individually or as paving units and which provide fluid storage within the paver blocks.

2. Discussion of the Related Art

As is known to those skilled in the art, paving systems historically create a surface impervious to rain. The water that falls on the paved surface runs off the edge of the paving surface rather than being absorbed into the ground beneath the paved surface. It is recognized that an increasing number of paved surfaces and the subsequent stormwater runoff from these paved surfaces contributes to lowered water tables and rising stream levels. Thus, it is a previously recognized problem with paving systems that stormwater runoff needs to be managed.

Historically, it was known in the prior art to manage stormwater using a curb and gutter system to guide the stormwater into sewer systems. More recently the stormwater has been guided into detention basins to allow the water to be absorbed closer to the paved surface. Needless to say, it is desirable to provide a porous pavement system allowing the stormwater to drain through the paving system and to be absorbed into the ground under the paving system, minimizing the need for any additional stormwater management system.

However, such a porous pavement system has not been fully met without incurring various disadvantages. For example, U.S. Pat. No. 5,797,698 and U.S. Pat. No. 6,939,077 disclose paving elements designed to allow water to drain between adjacent paving blocks. While these paver blocks, as disclosed, allow stormwater to drain down the sides of the block, they are still susceptible to one of the major drawbacks of existing porous pavement systems: they are totally dependent on the aggregate subgrade and the underlying soil for infiltration. Sandy or rocky soils have more cracks and fissures that allow the water to filter into and away from the surface, but heavy, clay soils do not drain quickly and require a longer retention time prior to the water entering the soil.

Another unsatisfactory, previously recognized approach to solving the problem of being dependent on the subgrade and soil for infiltration involves the use of underground storage systems. These storage systems are made of plastic and have several feet of aggregate dumped on top of them. A disadvantage of this approach is the inability to clean out the underground storage systems once they are filled with sedimentation and particulates from stormwater runoff. Therefore, a preferred solution will manage the stormwater runoff to improve infiltration of the water into any type of soil and, if it becomes necessary, will allow for sedimentation to be cleaned out from the water storage system.

SUMMARY AND OBJECTS OF THE INVENTION

Consistent with the foregoing and in accordance with the invention as embodied and broadly described herein, a paver block and a porous pavement system are disclosed in suitable detail to enable one of ordinary skill in the art to make and use the invention.

In one embodiment of the invention, a paver block includes an upper surface and a lower surface opposite the upper surface. The upper and lower surfaces are connected by a plurality of sides. At least one of the sides includes a drainage spacer that extends along at least a portion of the side. At least one of the lower surface and the plurality of sides has a cavity at least partially enclosed by the paver block. The cavity allows fluid to be stored within the paver block, and the volume of the cavity is at least two percent of the volume of the paver block.

In another embodiment of the invention, the cavity extends along the lower surface of the paver block. The width of the cavity is between 25 and 50 percent of the width of the lower surface, and the height of the cavity is between 25 and 50 percent of the height of one of the sides of the paver block.

In still another embodiment, the cavity extends along one of the sides of the paver block. The height of the cavity is between 25 and 50 percent of the height of one of the sides, and the width of the cavity is between 20 and 50 percent of the width of the upper surface of the paver block.

In another embodiment, the upper surface joins the plurality of sides at a rounded edge, and the angle, alpha, between at least one of the sides and a vertical plane is less than about three degrees. In yet another embodiment, the cavity of the paver block is arched, and in still another embodiment, the cavity of the paver block has sufficient volume to store at least an inch of rain that falls on the upper surface of the block.

In one embodiment, the paver block includes an upper surface and a lower surface opposite the upper surface. The upper and lower surfaces are connected by a plurality of sides. At least one of the sides includes a drainage spacer that extends along at least a portion of the side. A first side of the paver block contains at least one aperture and a second, opposing side contains at least one aperture. Each of the apertures on the first side has a corresponding aperture on the second side and a fluid passage is defined between each of the corresponding apertures. The volume of the at least one fluid passage is at least two percent of the volume of the paver block and allows fluid storage within the paver block.

In still another embodiment of the invention, a porous pavement system includes a plurality of paver blocks. Each of the plurality of blocks may be, but is not limited to, one of the embodiments of paver blocks described above. A cable runs through a plurality of ducts. Each duct is contained within one of the plurality of blocks. The cable-connected blocks may then be installed as a single paving unit.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
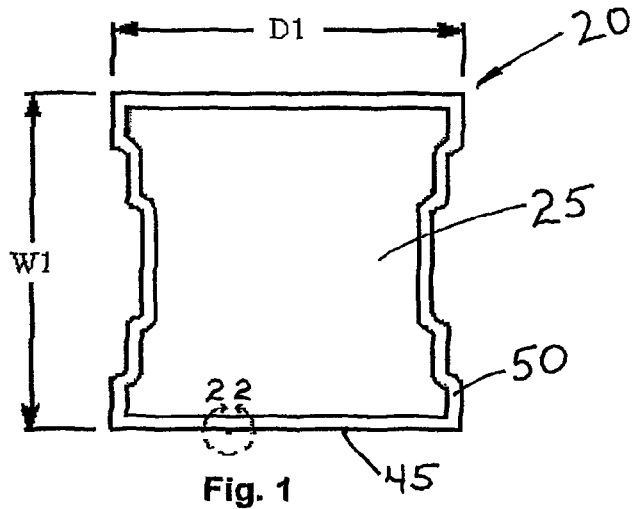
FIG. 1 is a top view of a first embodiment of a paver block.
Figure 2:
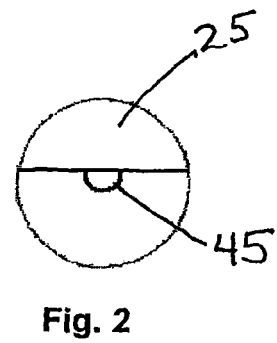
FIG. 2 is a sectional view taken along 2-2 of FIG. 1.
Figure 3:
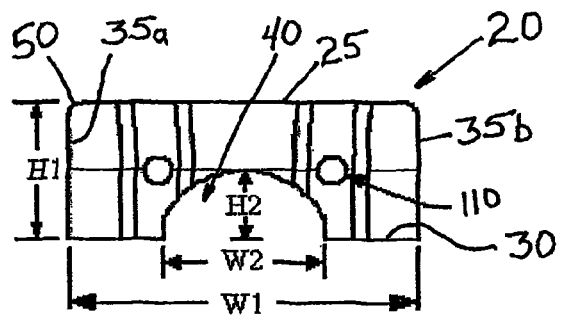
FIG. 3 is an end view of a first embodiment of a paver block.
Figure 4:
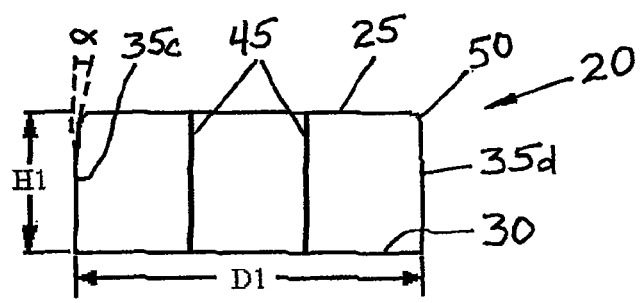
FIG. 4 is a side view of a first embodiment of a paver block.

In describing the preferred embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word "connected", "attached", or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

1. System Overview

In basic form, the invention is a porous paving system made up of paver blocks. These blocks may be installed individually or, alternately, cabling may be passed through ducts in the blocks and multiple paver blocks may be installed in a single unit. The paver blocks are designed to facilitate water drainage down the sides of the block. In addition, the paver blocks include a cavity allowing for the storage of fluid within the paver block. This results in a porous paving system that provides for stormwater storage within the paving system unlike conventional paving systems.

2. Detailed Description of Preferred Embodiments

Specific embodiments of the present invention will now be further described by the following, non-limiting examples which will serve to illustrate various features of significance. The examples are intended merely to facilitate an understanding of ways in which the present invention may be practiced and to further enable those of skill in the art to practice the present invention. Accordingly, the examples should not be construed as limiting the scope of the present invention.

Turning initially to FIGS. 1-4 and 12, a preferred embodiment of a paver block 20 used in a porous paving system 100 is depicted. The paver block 20 is generally comprised of an upper surface 25, a lower surface 30, a plurality of sides 35, and a cavity 40. It is contemplated that the paver block 20 could be of any shape known to one of ordinary skill in the art, including, but not limited to, a square, a rectangle, and a hexagon. A preferred embodiment is illustrated in FIG. 1 where the paver block 20 has two flat sides 35a, b and two stepped sides 35c, d. Additionally, the paver block 20, may be manufactured in a variety of heights, H1, widths, W1, and depths, D1, with a preferred minimum block size being at least 12 inches wide, 12 inches deep, and 5 inches high. The paver block may be manufactured out of any material known to one of ordinary skill in the art, but is preferably a concrete block. At least one drainage spacer 45 extends at least partially along one of the sides 35a-d of the paver block 20. In the preferred embodiment, two drainage spacers 45 extend vertically along the entire height, H1, of one of the sides 35a-d of the paver block 20. In addition, at least one, and preferably all, of edges 50 between the upper surface 25 and each of the sides 35a-d will be rounded, creating seepage down the sides of the block.

Figure 5:
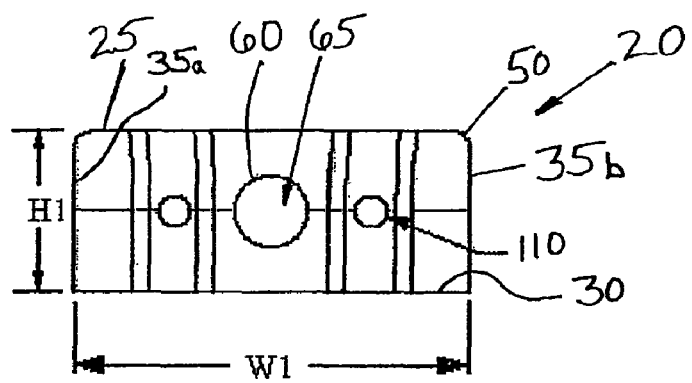
FIG. 5 is an end view of a second embodiment of a paver block.

A cavity 40 allows fluid storage within the paver block 20, and is especially designed to contain stormwater that has drained down the sides of the paver block 20. The cavity 40 may be partially or wholly defined by the paver block 20. The cavity 40 may be designed in a wide variety of shapes and sizes to allow for fluid storage within the paver block 20. In a preferred embodiment of the cavity 40, illustrated in FIG. 3, the cavity 40 is an arch extending along the entire bottom surface 30. Another embodiment of the cavity 40 is shown in FIG. 5 wherein the cavity 40 is a fluid passage 65 extending entirely through the paver block 20. A further embodiment of the cavity 40, not illustrated, may include multiple fluid passages 65 extending through the paver block 20. Still another embodiment of the cavity 40, not illustrated, may be an arch extending along the side 35a-d of the paver block. The aforementioned examples disclose several embodiments for the cavity 40, but the structure of the cavity 40 could be any shape or size capable of storing fluid within the block such as, but not limited to, a square or rectangular cavity extending across the bottom, side or through the paver block 20.

The paver block 20 is designed to balance fluid storage and structural integrity. Preferably, the volume of the cavity 40 allows for at least the first inch of stormwater that falls on the top surface 25 of the paver block 20 to be stored within the cavity 40 of the paver block 20. This stored water subsequently filters out of the cavity 40 into the aggregate subgrade 135 and soil below the paving system 100.

The paver blocks 20 may be installed individually to create a porous paved surface. Alternately, multiple blocks may be installed as a single paving unit 115 to increase speed and efficiency of installation of the porous pavement system 100. To permit installation as a single paving unit 115, each paver block 20 includes holes or ducts 110 passing through the paver block 20. Each duct 110 is sized to allow a cable 105 to pass therethrough, and is preferably one inch in diameter. In addition, the sides 35a-d of the blocks through which the ducts 110 pass will have some angle, alpha, between the side 35a-d and a vertical plane. It is desirable to minimize this angle as much as possible, but the angle allows some flexibility between blocks in a paving unit 115. It is desirable to keep this angle, alpha, less than 3 degrees and preferably between 1 and 2 degrees.

Figure 6:
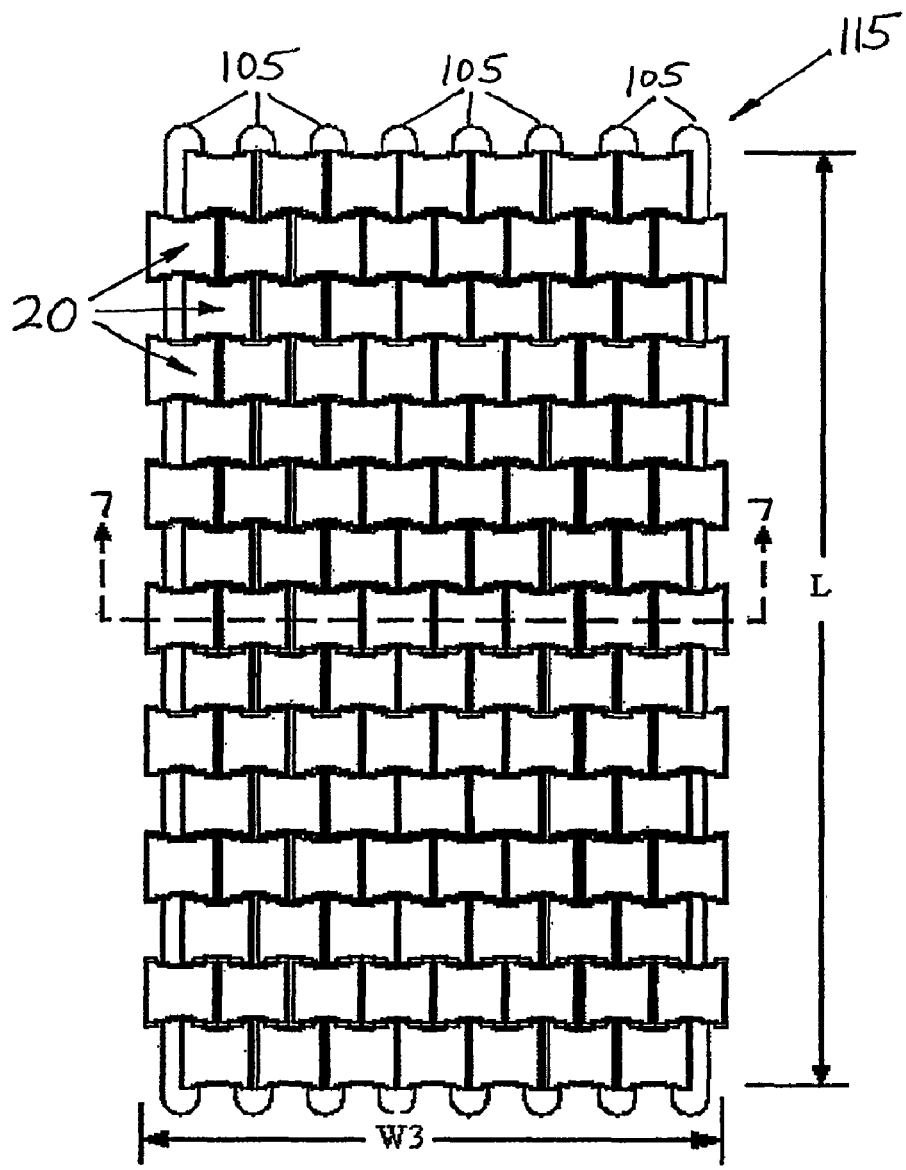
FIG. 6 is a top view of a first embodiment of a paving unit.
Figure 7:
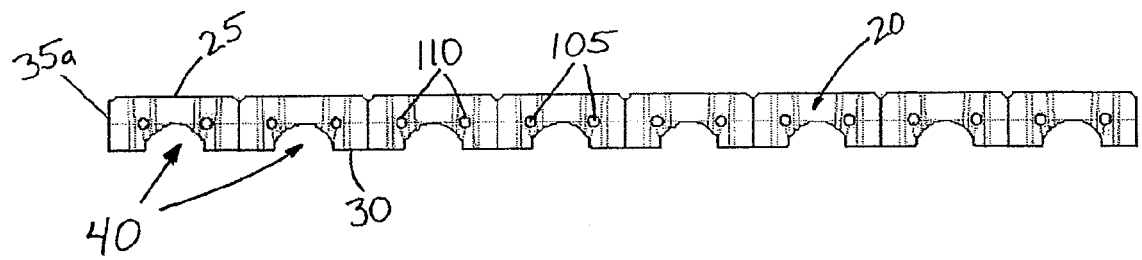
FIG. 7 is a sectional view taken along 7-7 of FIG. 6.

Referencing FIG. 6, the paving unit 115 is constructed by passing at least one cable 105 through multiple paver blocks 20. It is contemplated that the paving unit 115 will be of varying widths, W3, and lengths, L, to accommodate the desired application, including, but not limited to, pathways, driveways, parking lots, and roads. Preferably the paving unit 115 is about 8 feet wide and may extend from 8 to 60 feet in length. Based on its application, the paver block may accommodate either pedestrian or vehicular traffic. The paver block 20 is preferably designed to accommodate a load of up to 4000 pounds per square inch.

Figure 8:
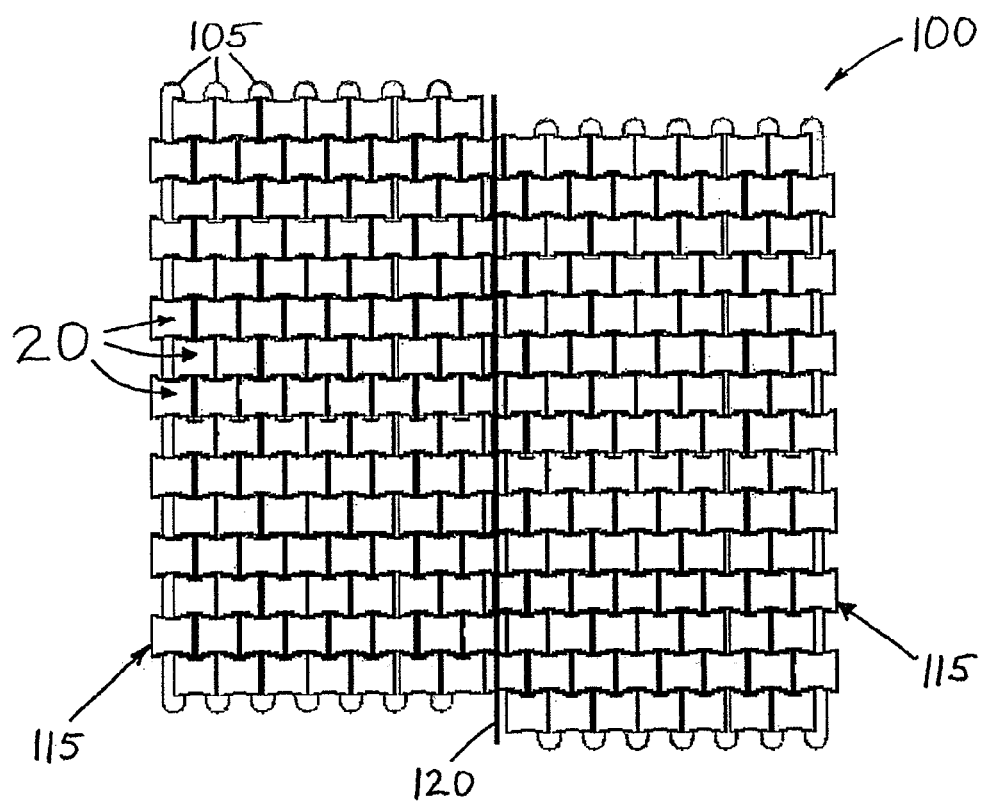
FIG. 8 is a top view of a first embodiment of a porous paving system.
Figure 9:
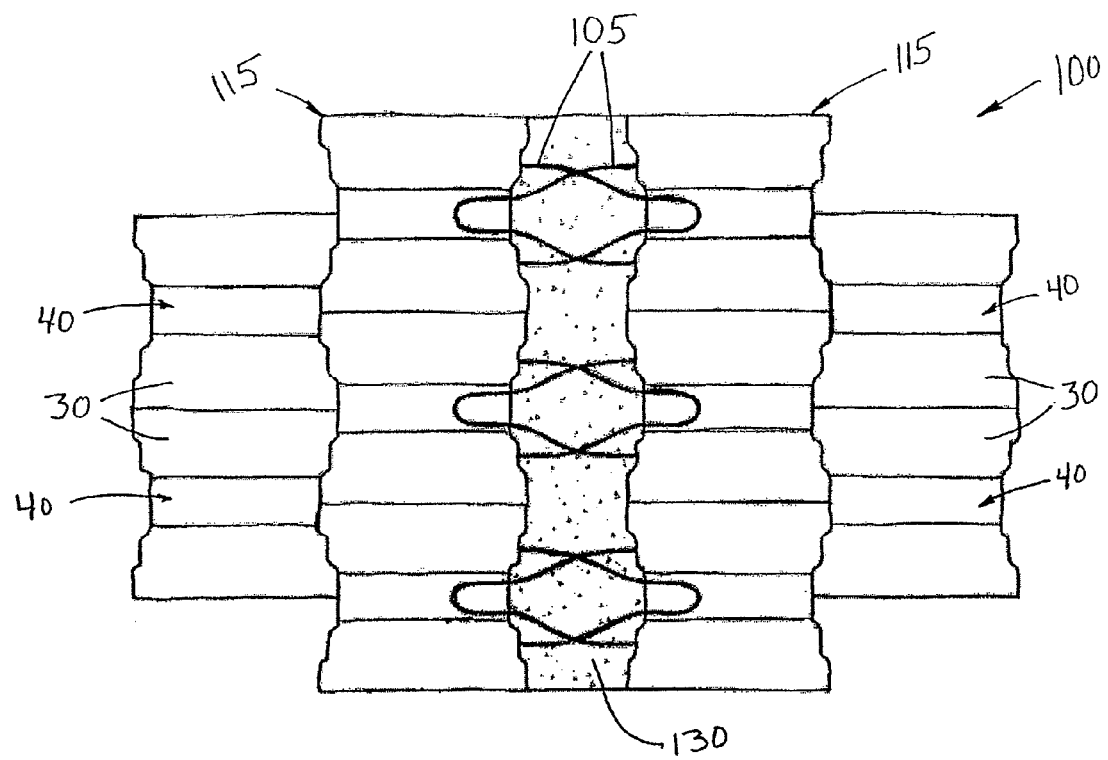
FIG. 9 is a bottom view of a grout joint connecting two paving units.
Figure 10:
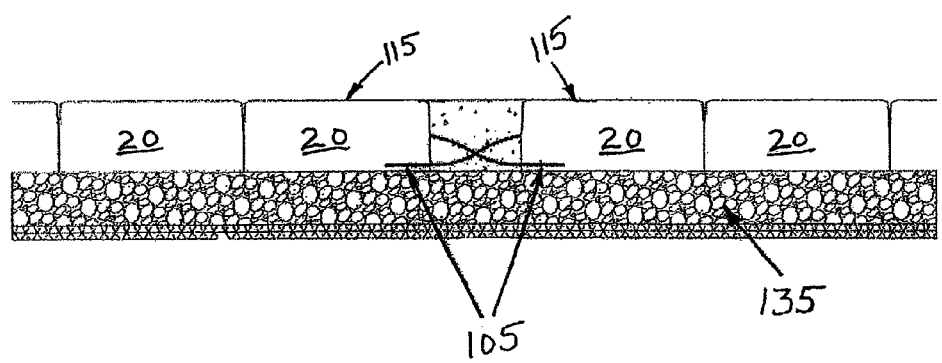
FIG. 10 is a sectional view taken along 10-10 of FIG. 9.

Referencing FIGS. 8 and 9, multiple paving units may be installed either adjacent to each other or in an end-to-end configuration. When two paving units 115 are installed adjacent to each other, the paver blocks 20 along the side of a paving unit 115 are staggered such that the side blocks of the first paving unit 115 interweave with the side blocks of the second paving unit 115, creating a continuous paved surface. In addition, the ducts 110 of the paver blocks 20 in the first paving unit 115 align with the ducts 110 of the paver blocks 20 in the second paving unit 115, allowing an interlocking cable 120 to pass therethrough, securing the first paving unit 115 to the second paving unit 115.

When the blocks of two paving units 115 are installed in an end-to-end configuration, a preferred joining method is depicted in FIG. 9. The cables 105 of the first paving unit 115 are tucked into the cavities 40 of the paver blocks 20 at the end of the second paving unit 115. Likewise, the cables 105 of the second paving unit 115 are tucked into the cavities 40 of the paver blocks 20 at the end of the first paving unit 115. A sheath 125 is laid into the gap between the two paving units 115, desirably using a very narrow veneer plastic sheath. Preferably, the plastic sheath 125 is only ten to twelve inches wide and eight to ten mils thick. This sheath prevents grout from entering the cavities 40 of the paver blocks 20 at the end of either paving unit 115 and additionally isolates the cables 105 from the grout. Finally, grout is poured between the two paving units 115 to form a joint 130. The grout may be of any type known to one of skill in the art and suitable for the application, but is preferably a pervious concrete or small aggregate grout.

Figure 11:
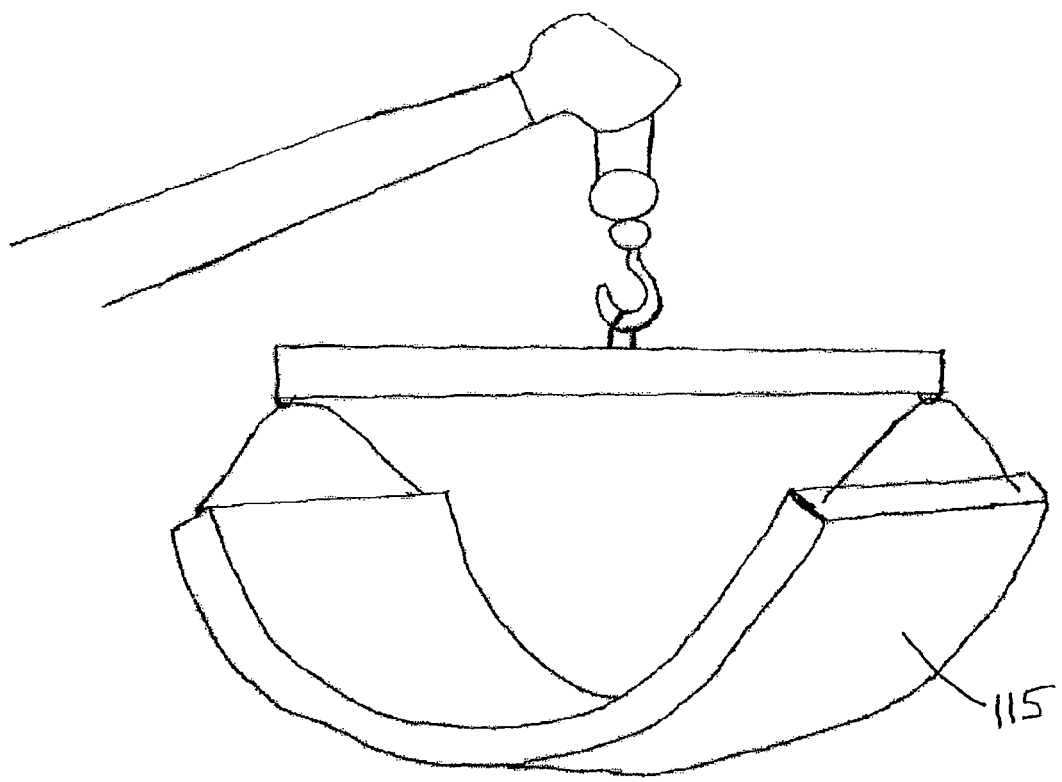
FIG. 11 is an exemplary embodiment of lifting a paving unit.
Figure 12:
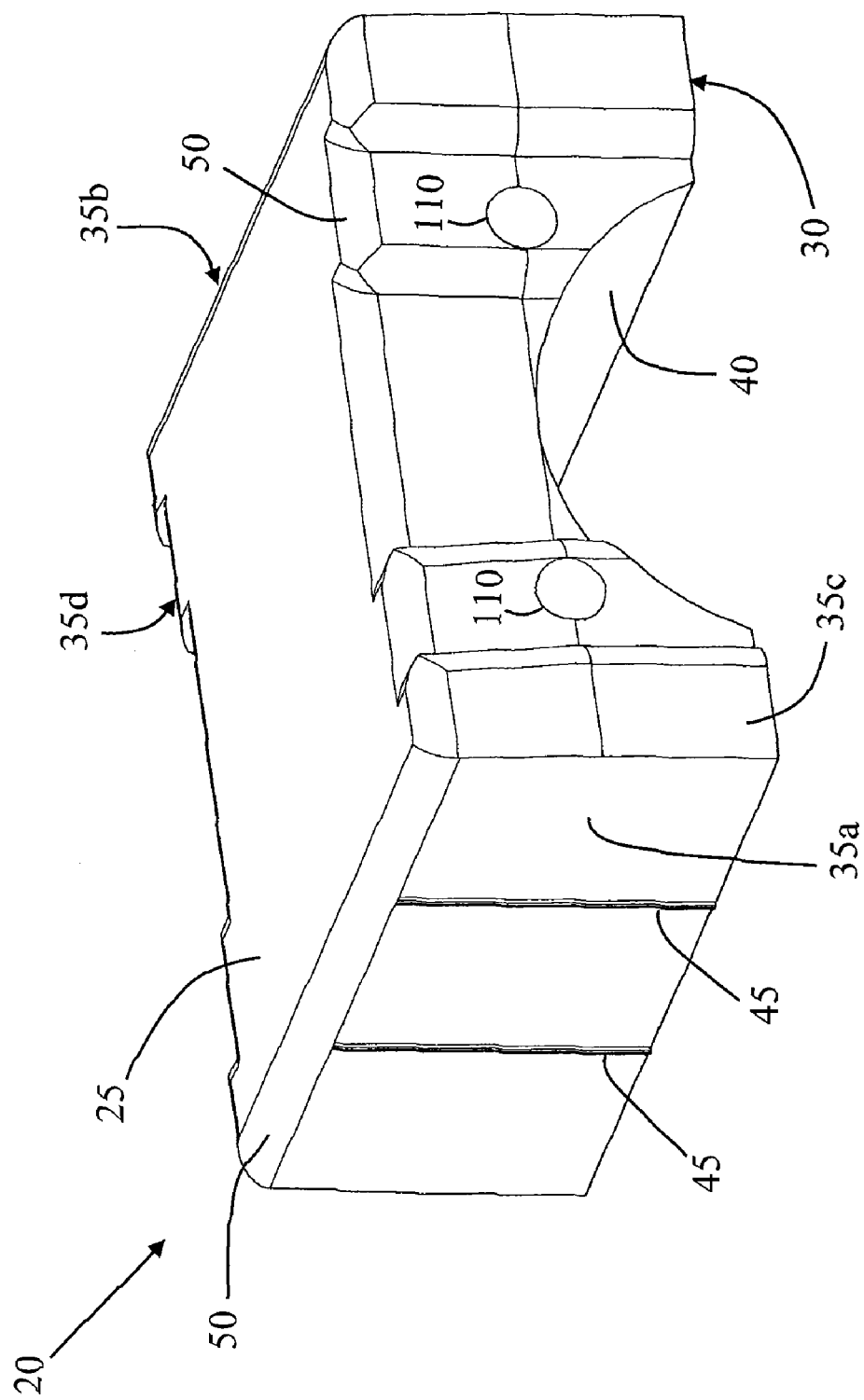
FIG. 12 is an isometric view of the first embodiment of a paver block as illustrated in FIGS. 1, 3, and 4.

Each paving unit is preferably installed as a single unit. Referring to FIG. 11, an exemplary paving unit 115 is being lifted using a crane, but installation may be performed by any means known to one skilled in the art, such as a forklift. Further, if cleaning of the cavities 40 of the paver blocks 20 becomes necessary, the paving unit 115 may be subsequently lifted out, the cavities 40 and subgrade 135 cleaned of debris, and the paving unit 115 reinstalled.

In another embodiment, each duct is about 2.75 inches from the bottom of each block. Each paving unit may extend from about 8 feet to about 60 feet in length. In a further embodiment, the cavities in each of the plurality of blocks has sufficient volume to store at least one inch of rain from the upper surface of the plurality of blocks in the paving unit. The stored rain water then filters into the subgrade under the paving unit.

In yet another embodiment of the invention, the cable may be, but is not limited to, one of the following materials: polyester, stainless steel, and galvanized steel. The paving unit, after having been installed, may subsequently be lifted as a single unit to allow cleaning of the cavities of each of the paving blocks if necessary. The paving unit may further be reinstalled as one unit once cleaning of the cavities is complete. In still another embodiment, the cavities of each of the paving blocks may be cleaned while the paving unit remains installed.

In another embodiment, a first paving unit may be installed adjacent to a second paving unit. The blocks along the edges of the first paving unit and the second paving unit interweave. In yet another embodiment, a cable may alternately pass through a duct of the first paving unit and a duct of the second paving unit to interlock the first and the second paving units.

In a final embodiment, two paving units may be installed such that an end of the first paving unit is positioned next to the end of the second paving unit. A sheath may be used, preferably an 8 to 10 mil thickness plastic, to line the area between the two paving units and prevent grout from entering the cavities on the plurality of blocks. A grout joint may seal the area between the two paving units. The grout joint may consist of, but is not limited to, pervious concrete or small aggregate.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

Moreover, the individual components need not be formed in the disclosed shapes, or assembled in the disclosed configuration, but could be provided in virtually any shape, so as to provide a paver block with a cavity capable of storing fluid. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

What is claimed is:

1. A paver block comprising:
   an upper surface;
   a lower surface opposite the upper surface;
   a plurality of sides extending between the upper and the lower surface;
   at least one drainage spacer extending along at least a portion of one of the plurality of sides; and
   wherein at least one of the lower surface and the plurality of sides of the paver block has a cavity at least partially enclosed by the paver block and wherein the cavity allows fluid storage within the paver block and the volume of the cavity is at least two percent of the volume of the paver block, and wherein:
   two of the plurality of sides are substantially planar and opposite each other,
   two of the plurality of sides are stepped and opposite each other, and
   an opening of the cavity is present on each of the stepped sides.

2. The paver block of claim 1 wherein the cavity extends along the lower surface, the width of the cavity is at least 25 percent of the width of the lower surface, and the height of the cavity is between 25 and 50 percent of the height of one of the sides; and
   wherein each of the edges between the upper surface and each of the sides are rounded, creating seepage down the sides of the block.

3. The paver block of claim 1 wherein the upper surface joins the plurality of sides at a rounded edge and wherein an angle, alpha, between at least one of the sides and a vertical plane is equal to or less than about 3 degrees; and
   wherein two drainage spacers extend vertically along a majority of the height, H1, of each of the substantially planar sides of the paver block.

4. The paver block of claim 1 wherein the cavity is arched; and wherein the paver block size is about 12 inches wide, 12 inches deep, and 5 inches high.

5. The paver block of claim 4 wherein the cavity has sufficient volume to store at least an inch of rain, which falls on the upper surface of the block, within the cavity of the paver block.

6. The paver block of claim 1 wherein a first stepped side has a first pair of openings and a second stepped side, opposite the first stepped side, has a second pair of openings in communication with the first pair of openings to define a pair of ducts passing through the paver block; and wherein the stepped sides each include a first planar surface, and wherein, when the block is turned on its side, each stepped side includes a second planar surface stepped higher than the first, a third planar surface opposite the second planar surface stepped an equal height, a fourth planar surface stepped higher than the second planar surface, and a fifth planar surface opposite the fourth planar surface stepped an equal height.

7. The paver block of claim 6 wherein the angle, alpha, between one of the sides and a vertical plane, is greater than or equal to about 1 degree; and wherein the cavity is an arch extending along the entire bottom surface of the paver block.

8. The paver block of claim 6, wherein the cavity opening is wider than the width of the first planar surface.

9. The paver block of claim 7, wherein the arched cavity has an opening that is not as wide as the width between an end of the second step and an end of the third step.

10. The paver block of claim 6, wherein the openings of the two ducts are located, at least in part, on the steps between the first planar surface and each of the second and third planar surfaces.

11. The paver block of claim 6, wherein the drainage spacers extend along the substantially planar sides.

12. A paver block comprising:
an upper surface;
a lower surface opposite the upper surface;
a plurality of sides extending between the upper and the lower surface;
at least one drainage spacer extending along at least a portion of one of the plurality of sides;
at least two stepped sides, each stepped side having five planar surfaces;
a pair of ducts going through the block between the stepped sides, wherein each duct is sized to allow a cable to pass therethrough; and
wherein a first of the plurality of sides contains at least one first aperture and a second, opposing side contains at least one second aperture opposing each of the first apertures on the first side, and wherein a fluid passage through the paver block connects the opposing first and second apertures, allowing fluid storage within at least two percent of the volume of the paver block; and
wherein the stepped sides of the block through which the ducts pass will have some angle, alpha, between each side and a vertical plane, and wherein the angle, alpha, is less than 3 degrees.

13. The paver block of claim 12, further comprising a pair of connecting cables running through the ducts.

* * * * *